United States Patent
Schwarz

(10) Patent No.: US 8,960,017 B2
(45) Date of Patent: Feb. 24, 2015

(54) SYSTEM AND METHOD FOR ULTRASONIC METERING USING AN ORIFICE METER FITTING

(71) Applicant: Daniel Measurement and Control, Inc., Houston, TX (US)

(72) Inventor: Darren Scott Schwarz, Cypress, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 184 days.

(21) Appl. No.: 13/676,287

(22) Filed: Nov. 14, 2012

(65) Prior Publication Data

US 2014/0130606 A1    May 15, 2014

(51) Int. Cl.
*G01F 1/66*    (2006.01)

(52) U.S. Cl.
CPC .  *G01F 1/66* (2013.01); *G01F 1/663* (2013.01)
USPC .................................................. 73/861.25

(58) Field of Classification Search
USPC ............... 73/861.25, 861.61, 861.52, 861.22, 73/861.04, 861.27
See application file for complete search history.

(56) References Cited

U.S. PATENT DOCUMENTS

| | | | |
|---|---|---|---|
| 6,101,885 A * | 8/2000 | Touzin et al. | 73/861.22 |
| 6,128,072 A * | 10/2000 | Kiel et al. | 356/28 |
| 7,258,024 B2 | 8/2007 | DiMarco et al. | |
| 7,591,192 B2 | 9/2009 | Williams | |
| 7,637,167 B2 * | 12/2009 | Monmont et al. | 73/861.04 |
| 2005/0210999 A1 | 9/2005 | Sylvia et al. | |
| 2009/0266175 A1 | 10/2009 | Monmont et al. | |
| 2013/0212865 A1 * | 8/2013 | Herve | 29/525.06 |

OTHER PUBLICATIONS

International Patent Application No. PCT/US2013/069389, PCT International Search Report and Written Opinion dated Feb. 25, 2014 (11 p.).

* cited by examiner

*Primary Examiner* — Jewel V Thompson
(74) *Attorney, Agent, or Firm* — Conley Rose, P.C.

(57) ABSTRACT

A method of retrofitting an orifice meter includes providing an orifice fitting body having a bore, an orifice plate, a plurality of tap holes, and a plurality of pressure sensors installed in the plurality of tap holes. The method further includes removing the orifice plate and the plurality of pressure sensors from the orifice fitting body and installing a plurality of transducers into the plurality of tap holes. At least one of the plurality of transducers is configured to generate a signal and at least one of the plurality of transducers is configured to receive the signal. Additionally, the method includes measuring a flow rate of a fluid flowing through the bore based on an output of each of the plurality of transducers.

16 Claims, 6 Drawing Sheets

SYSTEM AND METHOD FOR ULTRASONIC METERING USING AN ORIFICE METER FITTING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Technical Field

The disclosure relates generally to measuring the flow rate of a fluid flowing through a piping section. More particularly, the disclosure relates to retrofitting an orifice meter fitting to receive and measure the flow rate using ultrasonic or optical measuring techniques.

2. Background of the Technology

In pipeline operations and other industrial applications, flow meters are used to measure the volumetric flow rate of a gaseous or liquid flow stream moving through a piping section. It is often desirable to know with accuracy the amount of fluid flowing in the stream and particular accuracy is demanded when the fluid is changing hands, or during "custody transfer." Even where custody transfer is not taking place, however, measurement accuracy is desirable.

Flow meters for measuring the flow rate of a fluid in a piping section are available in many different forms. One common flow meter is an orifice meter, which measures the pressure on either side of an orifice plate extended across the flow to determine the flow rate passing through the piping section. Other types of meters include ultrasonic and optical meters, which employ ultrasonic acoustic signals and light beams, respectively, to measure the flow rate of a fluid in a given piping section.

SUMMARY

Apparatus and method for using an orifice meter body to perform ultrasonic and optical metering are disclosed herein. In one embodiment, a flow meter includes an orifice fitting body. The orifice fitting body includes a housing, a bore for passing a fluid stream, and a plurality of tap holes. The housing is configured to house an orifice plate. The flow meter also includes a first ultrasonic transducer disposed in one of the plurality of tap holes. The first ultrasonic transducer is configured to generate and receive an acoustic signal.

Some embodiments are directed to a flow meter that includes an orifice fitting body. The orifice fitting body includes a housing, a bore for passing a fluid stream, and a plurality of tap holes. The flow meter further includes a first ultrasonic transducer disposed in a first of the plurality of tap holes and a second ultrasonic transducer disposed in a second of the plurality of tap holes. The housing is configured to house an orifice plate and the orifice plate is not installed within the housing. The first and second ultrasonic transducers are each configured to generate and receive an acoustic signal.

Other embodiments are directed to a method of retrofitting an orifice meter. The method includes providing an orifice fitting body having a bore, an orifice plate, a plurality of tap holes, and a plurality of pressure sensors installed in the plurality of tap holes. Additionally, the method includes removing the orifice plate and the plurality of pressure sensors from the orifice fitting body and installing a plurality of transducers into the plurality of tap holes. At least one of the plurality of transducers is configured to generate a signal and at least one of the plurality of transducers is configured to receive the signal. Further, the method includes measuring a flow rate of a fluid flowing through the bore based on an output of the plurality of transducers.

BRIEF DESCRIPTION OF THE DRAWINGS

For a detailed description of exemplary embodiments of the disclosure, reference will now be made to the accompanying drawings in which.

DETAILED DESCRIPTION

Figure 1:
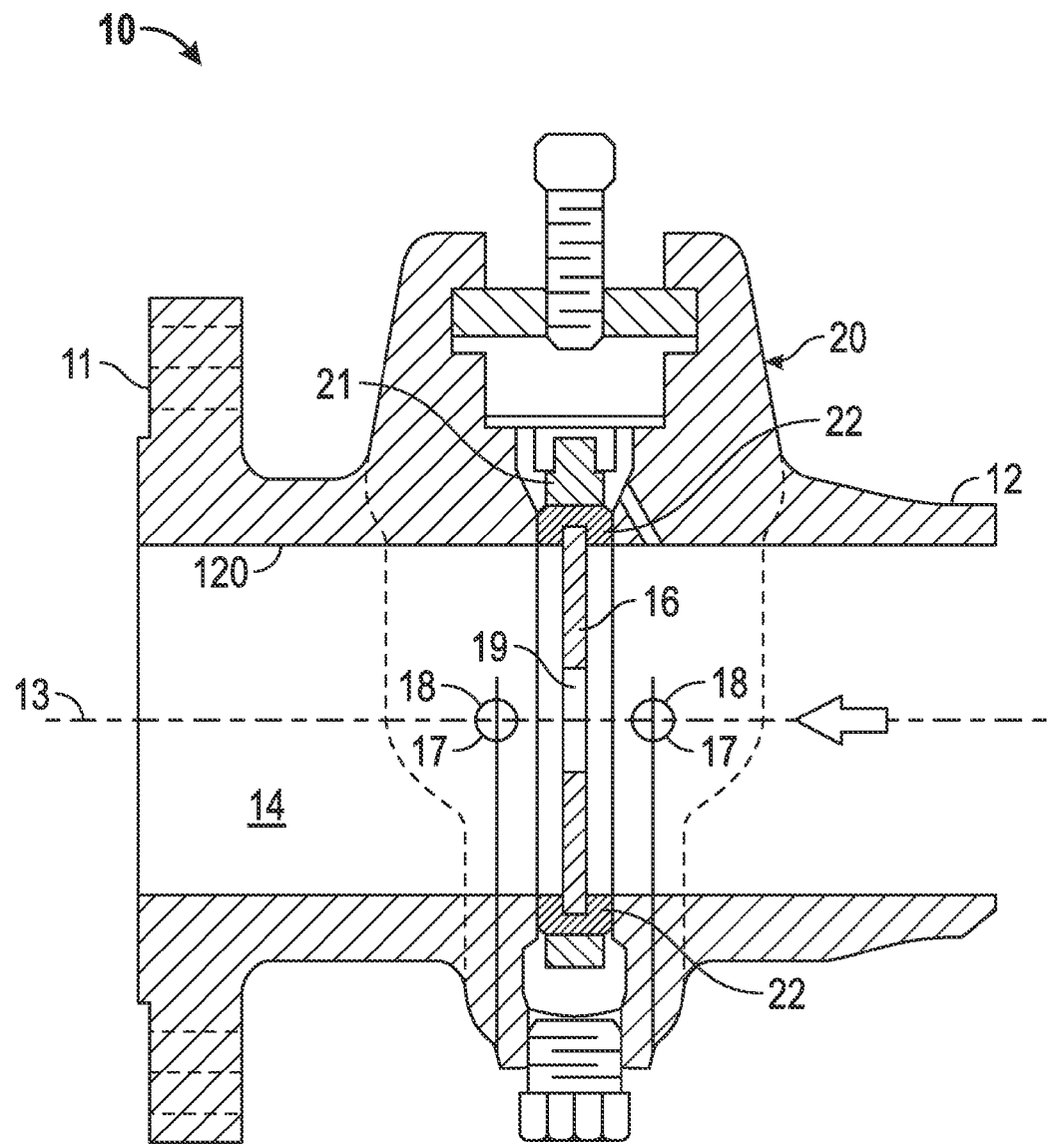
FIG. 1 shows a side cross-sectional view of an orifice flow meter.

The following discussion is directed to various exemplary embodiments of the invention. These embodiments are exemplary only and should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As used herein, the word "approximately" means "plus or minus 10%."

Certain terms are used throughout the following description and claims to refer to particular features or components. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection accomplished via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the given axis, and a radial distance means a distance measured perpendicular to the given axis.

An orifice meter comprises an orifice fitting outfitted with pressure sensors placed on either side of an orifice plate to measure the flow rate of a fluid passing through a piping section. Orifice meters are currently used in various piping sections worldwide, especially at points of custody transfer between different parties. To utilize newer techniques for measuring the flow rate of a fluid in one of the many piping sections that currently employ orifice meters, one must remove the orifice meter and install a new meter fitting. However, the removal of the orifice fitting and the installation of the replacement fitting employing the newer technology may be unduly expensive in terms of both the equipment and the labor associated with such work.

Embodiments of the present disclosure provide a method of updating existing orifice meters to incorporate newer technologies without incurring the high costs associated with a complete installation of a new metering system. The embodiments disclosed herein provide a method of retrofitting an orifice meter fitting to allow for the implementation of more advanced metering techniques such as ultrasonic and optical metering.

Figure 2:
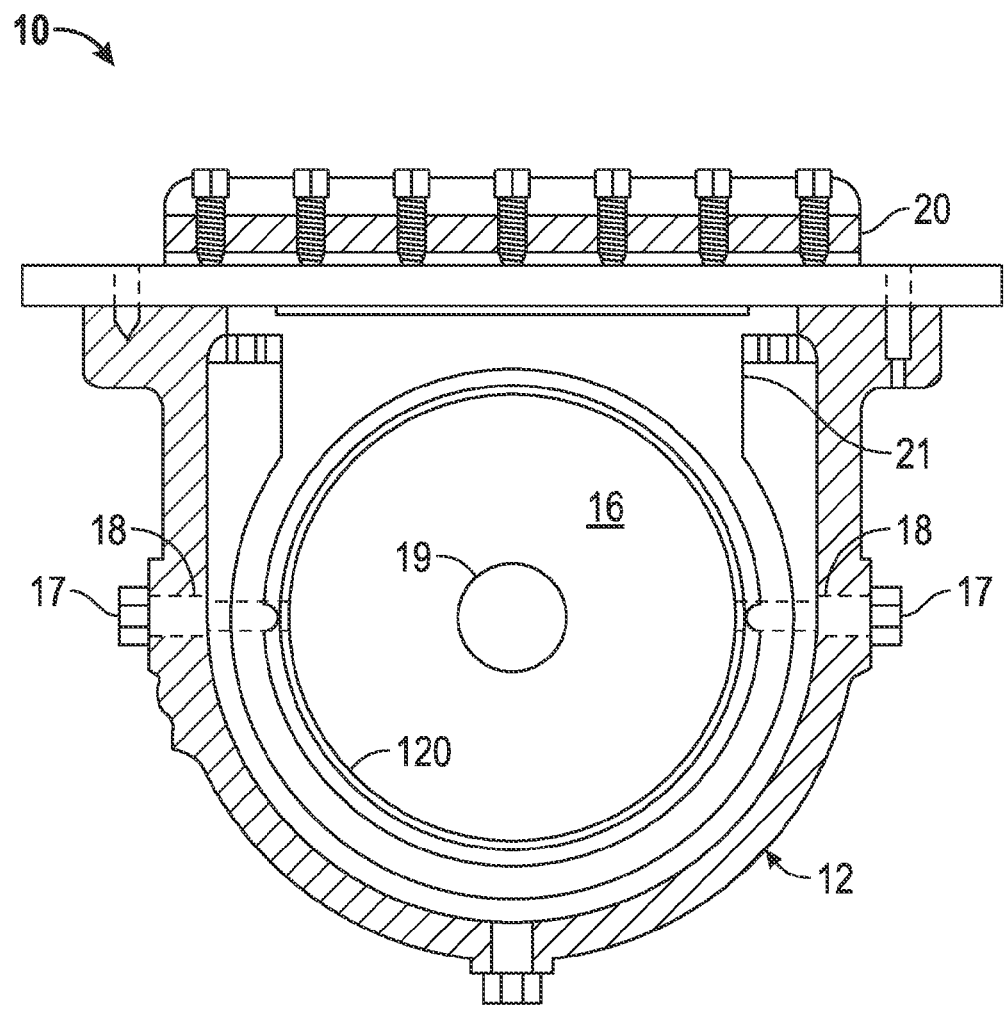
FIG. 2 shows a front cross-sectional view of an orifice flow meter.

Referring now to FIGS. 1 and 2, a side and front cross-sectional view of an orifice flow meter 10 are shown, respectively. Orifice flow meter 10 generally comprises a body 12, a central longitudinal axis 13, a central flow bore 14 that is concentrically aligned with axis 13 and has an inner wall 120, an orifice plate housing 20, an orifice plate carrier 21, an orifice plate 16 supported by carrier 21, and a plurality of tap holes 18 with a plurality of pressure sensors 17 installed therein. Flow meter 10 also includes a flange 11 for coupling body 12 to an existing piping section (not shown) such that central flow bore 14 is aligned with the central bore of the piping section (not shown). Orifice plate 16 has a central orifice 19 that is positioned within the central flow bore 14 of body 12 such that orifice 19 is generally concentric about axis 13. The size of orifice 19 is preferably smaller than the inner diameter of the central flow bore 14. Orifice fitting housing 20 houses and secures orifice plate 16 within body 12 via carrier 21 and includes a seal 22 that restricts flow around the outer edges of plate 16. In the embodiment shown, seal 22 comprises an elastomeric material. In other embodiments, seal 22 may be constructed out of metal. Additionally, while orifice meter 10 is shown and described as being a single chamber orifice fitting, it should be understood that other types of orifice fittings may be used, such as, for example, dual chamber orifice fittings, while still complying with the principles disclosed herein.

During operation, a fluid, in either a gaseous or liquid state, flows down central flow bore 14 and is forced through the orifice 19 in plate 16. Due to the principles of continuity and conservation of energy, the velocity of the fluid increases as the stream moves through orifice 19. This increase in velocity also gives rise to a pressure differential in the fluid across orifice 19. Pressure sensors 17 installed in tap holes 18 take pressure readings on the upstream and downstream sides of the orifice plate 16 and a separate flow computation system (not shown) then calculates the volumetric flow rate based on the measured pressure gradient.

Figure 3:
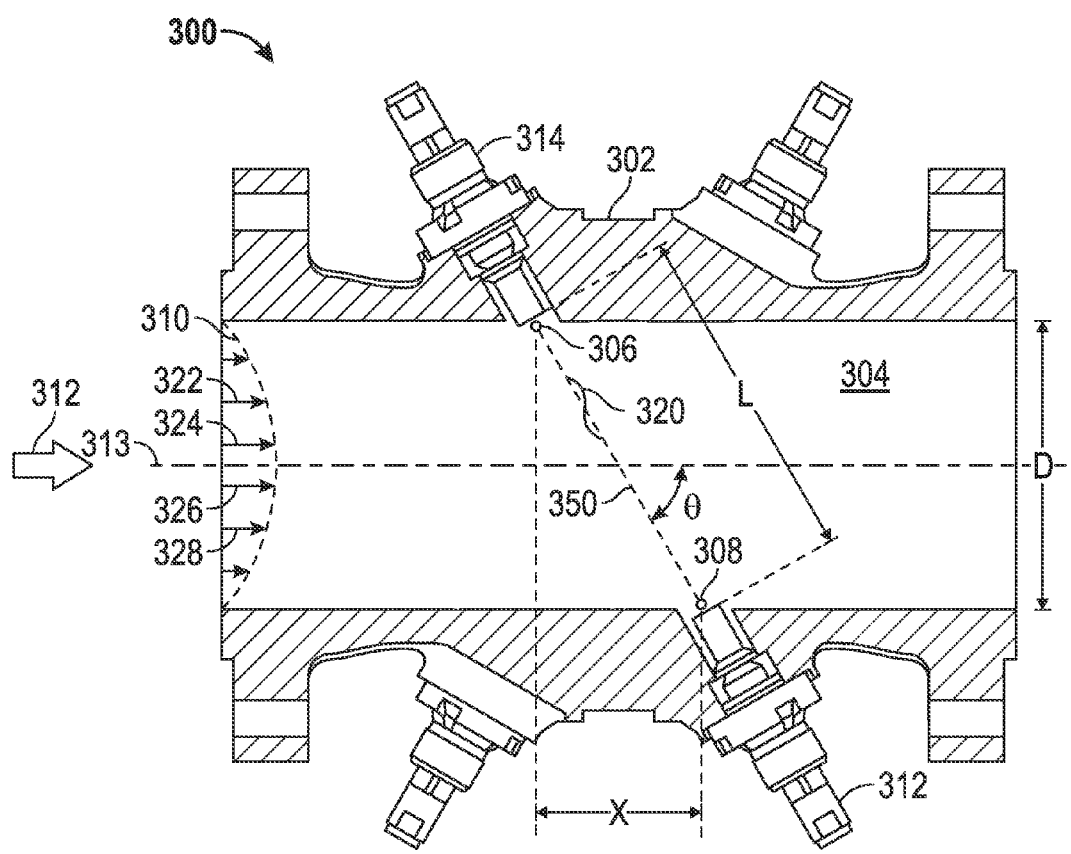
FIG. 3 shows a side cross-sectional view of an ultrasonic flow meter.

Referring now to FIG. 3, a cross-sectional view of an ultrasonic flow meter 300 is shown. As with orifice flow meter 10 shown in FIGS. 1 and 2, the ultrasonic flow meter 300 includes a body 302 and a central flow bore 304 through which the measured fluid flows. Ultrasonic transducers 312, 314 both generate and receive acoustic signals 320 generally having frequencies above 20 kilohertz. The acoustic signals may be generated and received by a piezoelectric element in each transducer 312, 314. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by a flow computation system (not shown) associated with flow meter 300.

A path 350, also referred to as a "chord," exists between illustrative transducer assemblies 312 and 314 at an angle θ to a central axis 313. The length of chord 350 is the distance between the face of transducer assembly 312 and the face of transducer assembly 314. Points 308 and 306 define the locations where acoustic signals (e.g., signal 320) generated by transducer assemblies 312 and 314 enter and leave fluid flowing through the body 302, respectively (i.e., the entrance to central flow bore 304). The position of transducer assemblies 312 and 314 may be defined by the angle θ, by a first length L measured between the faces of the transducer assemblies 312 and 314, a second length X corresponding to the axial distance between points 308 and 306, and a third length d corresponding to the diameter of the central flow bore 304. In most cases, distances d, X, and L are precisely determined during flow meter fabrication. A measured fluid, such as a gas or liquid, flows in a direction 312 with a velocity profile 310. Velocity vectors 322, 324, 326 and 328 illustrate that the fluid velocity through body 302 increases toward the central axis 313 of the body 302.

Initially, downstream transducer assembly 312 generates an ultrasonic signal that is incident upon, and thus detected by, upstream transducer assembly 314. Sometime later, the upstream transducer assembly 314 generates a return ultrasonic signal that is subsequently incident upon, and detected by, the downstream transducer assembly 312. Thus, the transducer assemblies exchange or play "pitch and catch" with ultrasonic signals 320 along chordal path 350. During operation, this sequence may occur thousands of times per minute.

The transit time of an ultrasonic signal 320 between illustrative transducer assemblies 312 and 314 depends in part upon whether the ultrasonic signal 320 is traveling upstream or downstream with respect to the fluid flow. The transit time for an ultrasonic signal traveling downstream (i.e., in the same direction 312 as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 300 carrying the fluid, the average velocity over the area of the central bore 304 may be used to find the volume of fluid flowing through the body 302.

Other embodiments of an ultrasonic flow meter measure Doppler shift to determine the velocity of the fluid flowing in the central flow bore 304. In such ultrasonic meters, a transmitting ultrasonic transducer generates an ultrasonic signal having a known frequency spectrum. The ultrasonic signal passes through the fluid flowing in the meter to a receiving ultrasonic transducer. The frequency spectrum of the ultrasonic signal is altered by the flow of the fluid through which the signal passes. The ultrasonic signal may pass directly between transducers or be reflected off the wall of the meter bore. The frequency spectrum of the received ultrasonic signal is analyzed via an attached flow computation system, and the velocity of the fluid flowing through the central flow bore 304 is determined based on the change in the frequency spectrum of the received ultrasonic signal relative to the frequency spectrum of the transmitted ultrasonic signal. In some such ultrasonic meters, flow velocity is determined based on Doppler shift measured for both upstream and downstream traveling ultrasonic signals.

Figure 4:
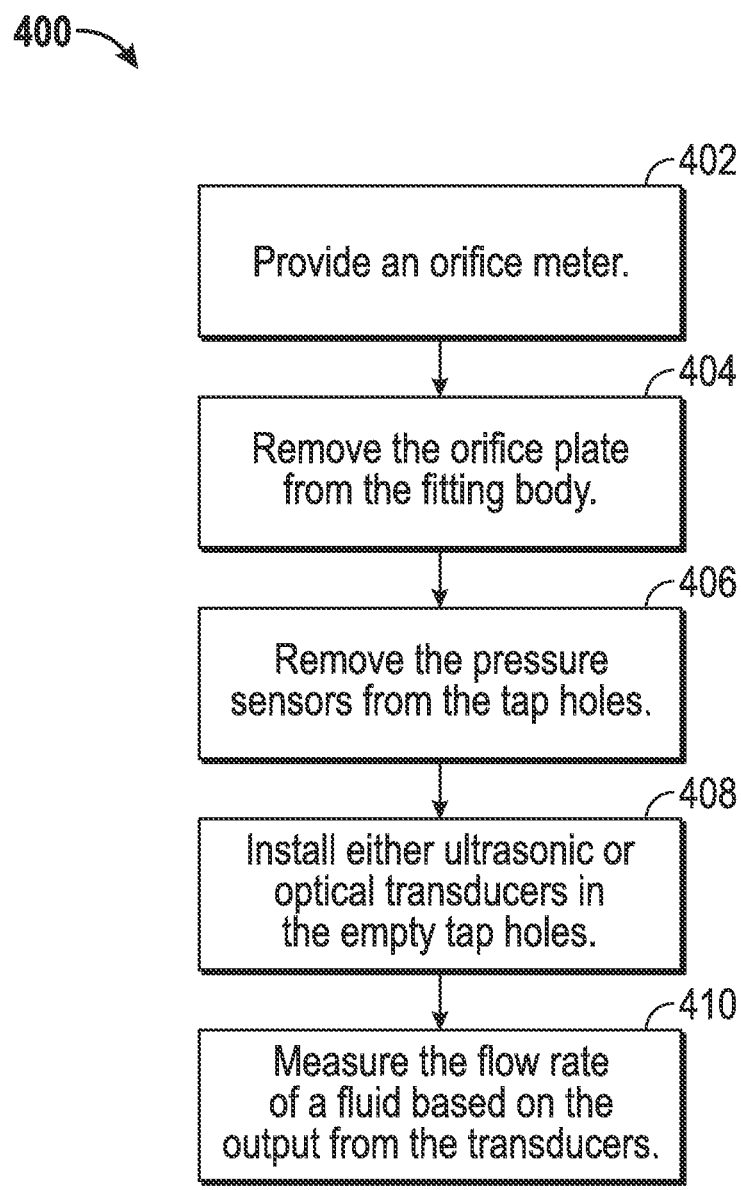
FIG. 4 shows a flow diagram for a method for converting an orifice meter into an ultrasonic or optical meter in accordance with principles disclosed herein.

Embodiments of flow meters disclosed herein include an orifice fitting body and apply ultrasonic or optical techniques to measure the fluid flow. Referring now to FIG. 4, a flow diagram for a method 400 for retrofitting an orifice meter to utilize ultrasonic or optical metering techniques is shown. Though depicted sequentially as a matter of convenience, at least some of the operations shown can be performed in a different order and/or performed in parallel. Additionally, some embodiments may perform only some of the operations shown. The operations of the method 400 may be performed without removing the orifice meter body from the pipeline or other flow measurement environment in which the orifice meter is installed.

Accordingly, in block 402, an orifice meter is provided. The orifice meter may be disposed to measure fluid flow in some embodiments. To convert the orifice meter to ultrasonic or optical technology, in block 404, the orifice plate is removed from the orifice fitting body. In block 406, the orifice meter's pressure sensors and associated measurement systems are decoupled from the orifice meter body by removing the sensors and/or pressure sensors from the tap holes. In block 408, in place of the pressure sensors, ultrasonic or optical transducers are installed into the tap holes and appropriate transducer control and signal measurement systems are coupled to the transducers external to the orifice meter body. The control and signal measurement systems may cause the transducers to generate signals that propagate through a fluid stream passing through the orifice meter body, and may determine velocity and/or volume of the fluid stream based on signals received by the transducers in block 410.

Figure 5:
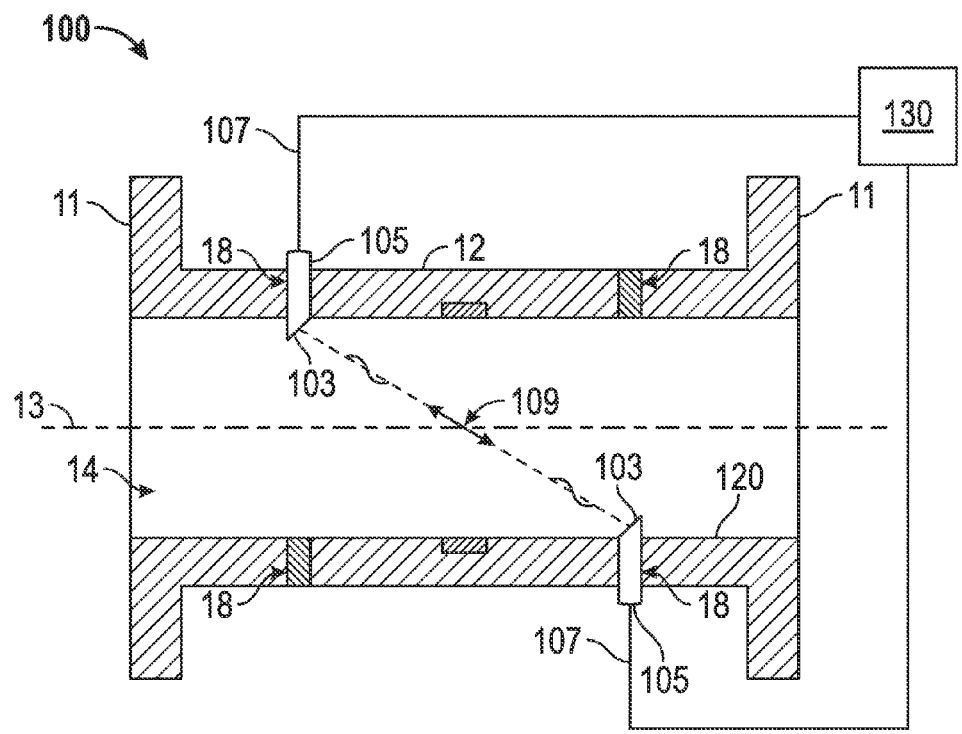
FIG. 5 shows a schematic top cross-sectional view of an illustrative embodiment of an orifice flow meter configured to implement ultrasonic flow measurement in accordance with the principles disclosed herein.

Referring now to FIG. 5, a top cross-sectional view of an illustrative embodiment of an orifice meter 100 configured to implement ultrasonic flow measurement is shown. Flow meter 100 comprises an orifice meter body 12 further comprising a central flow bore 14 and an inner wall 120 as is shown in FIGS. 1 and 2; however, the Orifice plate 16 and pressure sensors 17 have been removed. Instead, a pair of ultrasonic transducers 105 has been installed within the tap holes 18. All of the remaining tap holes 18 in which no ultrasonic transducer 105 has been installed may be plugged such that no fluid may escape out of said tap holes 18 during operation.

In the embodiment shown in FIG. 5, ultrasonic transducers 105 have been placed on opposing sides of the meter body 12. The transducers 105 may include angled faces 103 which are positioned such that the faces 103 are parallel to and generally align with one another. Additionally, each of the ultrasonic transducers 105 is configured to generate and receive an acoustic signal that is directed across the central flow bore 14 of body 12. Also, as is shown schematically in FIG. 5, ultrasonic transducers 105 are also coupled to a flow computation system 130 via cables 107. During operation, ultrasonic transducers exchange ultrasonic signals 109. The signals 109 are relayed to the flow computation system 130 via cables 107 and the fluid flow rate is calculated based on the transit times of the ultrasonic signals. In some embodiments of the flow meter shown in FIG. 5, the flow velocity and flow rate of a fluid passing through central flow bore 14 can be determined based on the Doppler shift of the transmitted ultrasonic signals. Also, it should be noted that other embodiments may calculate the flow rate of the fluid using different principles while still complying with the basic principles of the current disclosure.

Figure 6:
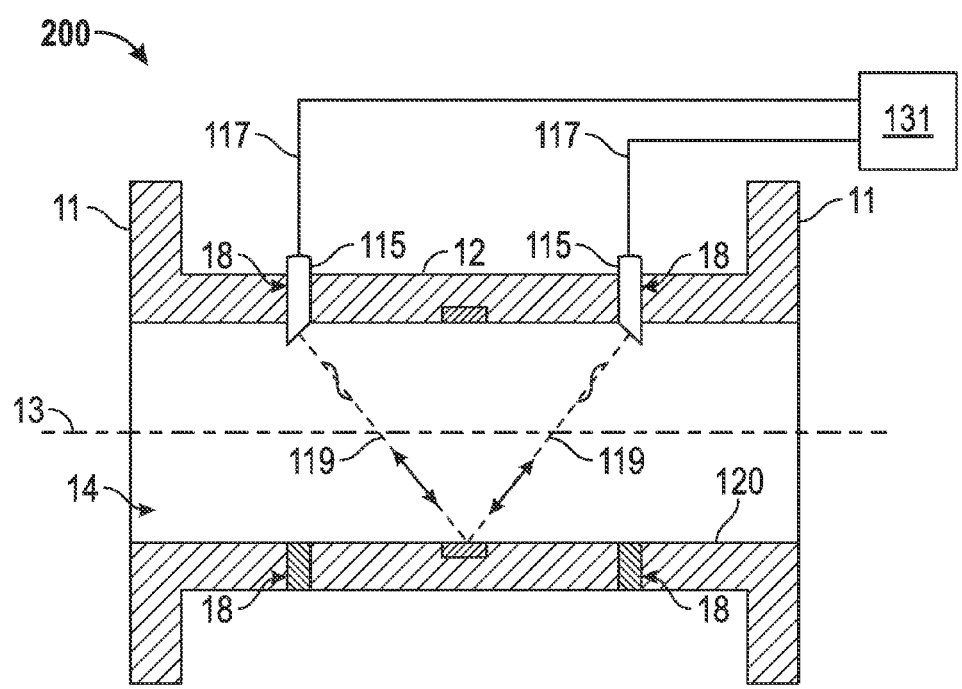
FIG. 6 shows a schematic top cross-sectional view of another illustrative embodiment of an orifice flow meter configured to implement ultrasonic flow measurement in accordance with the principles disclosed herein.

Referring now to FIG. 6, a top cross-sectional view of an illustrative embodiment of an orifice meter 200 configured to implement ultrasonic flow measurement is shown. Flow meter 200 comprises an orifice meter body 12 further comprising a central flow bore 14 and an inner wall 120 as is shown in FIGS. 1 and 2; however, the orifice plate 16 and pressure sensors 17 have been removed. Instead, a pair of ultrasonic transducers 115 has been installed within the tap holes 18. All of the remaining tap holes 18 in which no ultrasonic transducer 115 has been installed may be plugged such that no fluid may escape out of said tap holes 18 during operation.

In the embodiment shown in FIG. 6, ultrasonic transducers 115 are positioned on the same side of orifice meter body 12 and are each configured to generate and receive an ultrasonic acoustic signal 119 that is directed across the flow of a fluid flowing through central flow bore 14 and reflected off of the inner wall 120 of central flow bore 14. Also, as is schematically shown in FIG. 6, ultrasonic transducers 115 are also coupled to a flow computation system 131 via cables 117. During operation, ultrasonic transducers 115 exchange ultrasonic signals 119 that are reflected off of the inner wall 120. The signals 119 are relayed to the flow computation system 131 via cables 117, and the fluid flow rate is computed based on the reflected ultrasonic signals 119. In some embodiments, the fluid flow velocity, volume, etc. may be determined based on the Doppler shift of the reflected ultrasonic signals 119. In some embodiments of the flow meter shown in FIG. 4, the flow velocity and flow rate of a fluid passing through central flow bore 14 can be determined based on the transit times of the ultrasonic signals. Additionally, in some embodiments, only a single ultrasonic transducer is installed into one of the plurality of tap holes 18 such that an ultrasonic signal is generated by the single transducer, reflected off the inner wall of the meter body, and received by the same transducer. Also, it should be noted that other embodiments may calculate the fluid through different known techniques while still complying with the basic principles disclosed herein.

Figure 7:
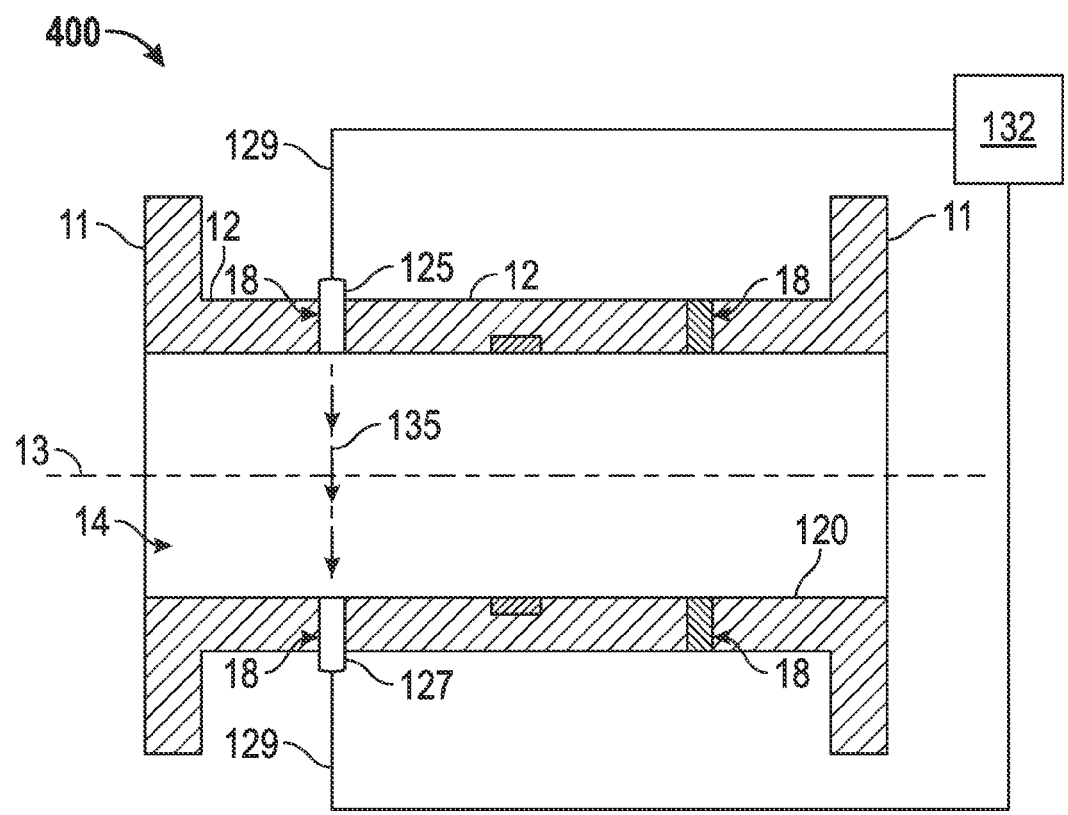
FIG. 7 shows a schematic top cross-sectional view of an illustrative embodiment of an orifice meter configured to implement optical flow measurement in accordance with the principles disclosed herein.

Referring now to FIG. 7, a top cross-sectional view of an illustrative embodiment of an orifice meter 400 configured to implement optical flow measurement is shown. Flow meter 400 comprises an orifice meter body 12 further comprising a central flow bore 14 and an inner wall 120 as is shown in FIGS. 1 and 2; however, the orifice plate 16 and pressure sensors 17 have been removed. Instead, an optical beam generator 125 (e.g., a laser diode and associated optics) and an optical sensor 127 have been installed in the tap holes 18. Remaining tap holes 18 in which neither an optical beam generator 125 nor an optical sensor 127 have been installed may be plugged such that no fluid may escape out of said tap holes 18 during operation.

In the embodiment shown in FIG. 7, optical beam generator 125 and optical sensor 127 are positioned on opposing sides of orifice meter body 12 and are positioned such that they are aligned. Also, as is schematically shown in FIG. 7, optical beam generator 125 and optical sensor 127 are also coupled to a flow computation system 132 via cables 129. In the embodiment shown, at least two light beams 135 are generated by optical beam generator 125. These light beams 135 are directed across the central flow bore 14 and are received by optical sensor 127. Optical sensor 127 detects the light reflected by particles entrained in the fluid that the beams 135 pass through. The difference in detection of particles at each beam is indicative of the velocity of the fluid passing through the central flow bore 14. The signals from optical generator 125 and optical sensor 127 are directed to the flow computation system 132 through cables 129 wherein the velocity of the fluid flowing through the central flow bore 14 is calculated based on the difference in particle detection timing with respect to different light beams. However, it should be noted that other embodiments may calculate the flow rate based on different known techniques while still complying with the principles disclosed herein.

While the disclosed embodiments are described herein with reference to particular implementations, this discussion is exemplary only, and it is to be understood that these embodiments are merely illustrative and that the scope of the subject matter claimed herein is not limited to them. Numerous variations and modifications will become apparent to those skilled in the art once the above disclosure is fully appreciated. It is intended that the following claims be interpreted to embrace all such variations and modifications.

What is claimed is:

1. A flow meter, comprising:
    an orifice fitting body comprising a housing, a bore for passing a fluid stream, and a plurality of tap holes, wherein the housing is configured to house an orifice plate;
    a first ultrasonic transducer disposed in a first of the plurality of tap holes;
    wherein the first ultrasonic transducer is configured to generate and receive an acoustic signal.

2. The flow meter of claim 1, wherein the first ultrasonic transducer is configured to direct an acoustic signal across the bore.

3. The flow meter of claim 1, configured such that the first ultrasonic transducer receives an acoustic signal that is reflected off of an inner wall of the bore.

4. The flow meter of claim 1, wherein the acoustic signal generated by the first ultrasonic transducer is at a frequency equal to or greater than 20 KHz.

5. The flow meter of claim 1, further comprising a second ultrasonic transducer disposed in a second of the plurality of tap holes, wherein the second ultrasonic transducer is configured to generate and receive an acoustic signal.

6. The flow meter of claim 5, wherein the first transducer and the second transducer include angled faces and wherein the angled faces of the first transducer and the second transducer are approximately parallel.

7. The flow meter of claim 6, wherein the first transducer and the second transducer are offset in the bore.

8. The flow meter of claim 5, further comprising a flow computation system that is coupled to the first transducer and the second transducer.

9. The flow meter of claim 8, wherein the flow computation system is configured to receive a signal from at least one of the first transducer and the second transducer and compute the flow rate of a fluid passing through the bore.

10. The flow meter of claim 8, wherein the flow computation system is configured to compute the fluid flow rate based on the Doppler shift of the acoustic signal received by at least one of the first transducer and the second transducer.

11. The flow meter of claim 8, wherein the flow computation system is configured to compute the fluid flow rate based on an acoustic signal that is reflected off of the inner wall of the bore.

12. The flow meter of claim 1, wherein at least the first of the plurality of tap holes is positioned on one side of the housing and at least a second of the plurality of tap holes is positioned on the opposing side of the housing.

13. A flow meter comprising:
    an orifice fitting body comprising a housing, a bore for passing a fluid stream, and a plurality of tap holes,
    a first ultrasonic transducer disposed in a first of the plurality of tap holes; and
    a second ultrasonic transducer disposed in a second of the plurality of tap holes;
    wherein the housing is configured to house an orifice plate;
    wherein the orifice plate is not installed within the housing; and
    wherein the first and second ultrasonic transducers are each configured to generate and receive an acoustic signal.

14. The flow meter of claim 13, further comprising a flow computation system that is coupled to the first transducer and the second transducer, wherein the flow computation system is configured to receive a signal from at least one of the first transducer and the second transducer and compute the flow rate of a fluid passing through the bore.

15. The flow meter of claim 14, wherein the flow computation system is configured to compute the fluid flow rate based on the Doppler shift of the acoustic signal received by at least one of the first transducer and the second transducer.

16. The flow meter of claim 1, wherein the housing is configured to house the orifice plate at a position,
    wherein the first ultrasonic transducer is disposed in the first of the plurality of tap holes on an upstream side of the position; and
    wherein the flow meter further comprises:
        a second ultrasonic transducer disposed in a second of the plurality of tap holes on a downstream side of the position;
        wherein the second ultrasonic transducer is configured to generate and receive an acoustic signal.

* * * * *